Oct. 2, 1962 A. J. THIEBLOT ETAL 3,056,335
PROJECTILE LAUNCHING MECHANISM
Filed April 20, 1949 3 Sheets-Sheet 1

INVENTORS
ARMAND J. THIEBLOT &
RODGER W. DAVIS
BY
Their ATTORNEYS.

Oct. 2, 1962 A. J. THIEBLOT ETAL 3,056,335
PROJECTILE LAUNCHING MECHANISM
Filed April 20, 1949 3 Sheets-Sheet 2
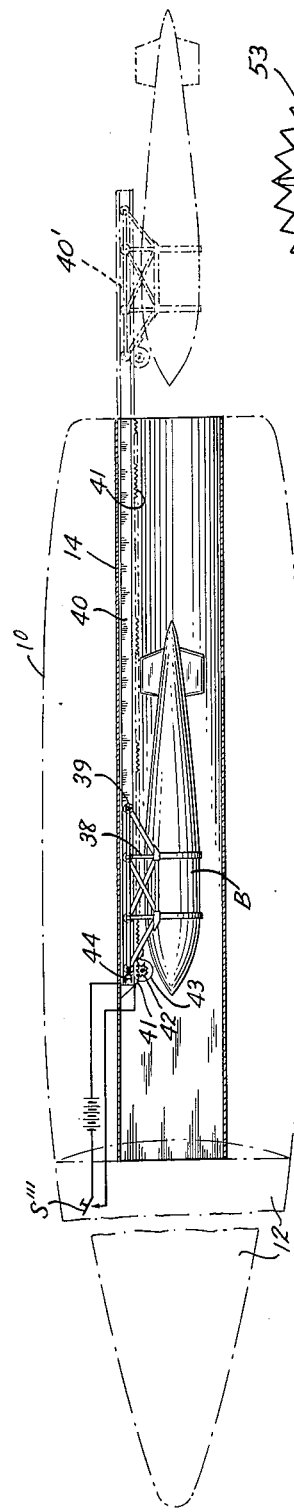
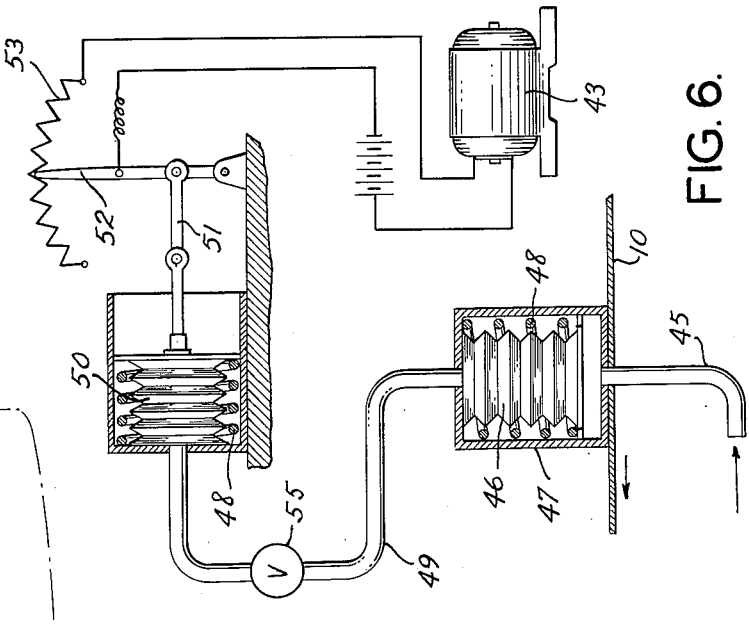
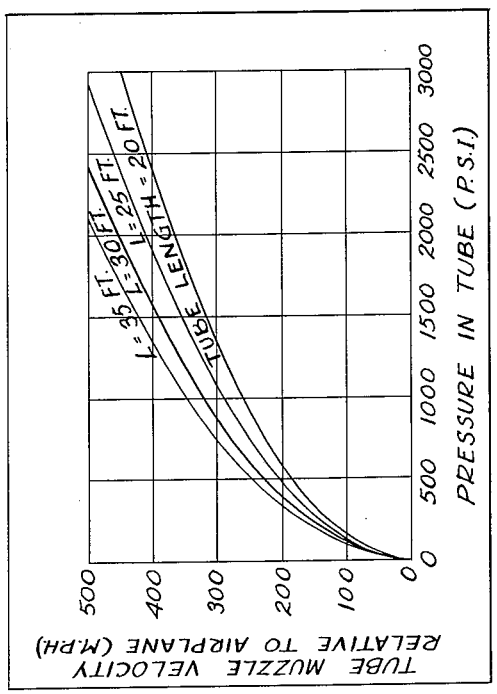
INVENTORS
ARMAND J. THIEBLOT &
RODGER W. DAVIS
BY
Campbell, Brumbaugh, Free & Graves
Their ATTORNEYS.

Oct. 2, 1962    A. J. THIEBLOT ETAL    3,056,335
PROJECTILE LAUNCHING MECHANISM

Filed April 20, 1949    3 Sheets-Sheet 3

INVENTORS
ARMAND J. THIEBLOT &
RODGER W. DAVIS
BY
Their ATTORNEYS.

United States Patent Office 3,056,335
Patented Oct. 2, 1962

3,056,335
PROJECTILE LAUNCHING MECHANISM
Armand J. Thieblot and Rodger W. Davis, Hagerstown, Md., assignors to Fairchild Stratos Corporation, a corporation of Maryland
Filed Apr. 20, 1949, Ser. No. 88,622
1 Claim. (Cl. 89—1.5)

This invention relates to projectile launching mechanism, and has particular reference to torpedo or bomb launching mechanism for high speed aircraft.

In copending application Serial No. 88,621, filed April 20, 1949, now U.S. Patent No. 2,714,999, there is disclosed a high speed bombing aircraft in which approximately the rear two-thirds of the fuselage is fitted with a bomb tunnel, which is coaxial with the longitudinal axis of the fuselage and in which a bomb is positioned with its center of gravity substantially coincident with the center of gravity of the aircraft, so that when the bomb is discharged through the open rear end of the tunnel, the trim of the aircraft is not materially affected, since the remaining disposable load of fuel is also grouped around the center of gravity and the fixed load of crew and equipment in the nose is counter-balanced about the center of gravity by the jet propulsion engines at the rear.

In accordance with the present invention, mechanism is provided which is particularly adapted for the type of aircraft disclosed in said copending application, for launching the projectile, such as a bomb or torpedo, from the aircraft in such a way and at a velocity substantially equal to the forward velocity of the aircraft, that the bomb is not disturbed by any differential velocity air streams and falls directly vertically to the target, thereby rendering bombing more accurate and avoiding the difficulties heretofore encountered in launching bombs and other projectiles accurately from high speed aircraft.

In a preferred embodiment of the invention, the projectile is driven rearwardly by power means at a speed predetermined by the speed of the aircraft at the particular instant and this predetermination may be automatically arranged by regulating the propulsion means of the projectile in accordance with an aircraft speed, such as by an air speed measuring instrument connected through a control mechanism to the bomb launching power mechanism. The bomb launching power mechanism may be electrical, pneumatic, mechanical or of the explosive or jet type, depending upon requirements.

It will be seen that the mechanism for launching projectiles from high speed aircraft, according to the invention is simple in operation and construction and affords a highly accurate and flexible means for launching bombs and torpedoes from aircraft travelling at very high speeds without impairment of bomb accuracy or requiring change of speed while over enemy territory to enable the bomb to be discharged.

For a more complete understanding of the invention, reference may be had to the accompanying drawings in which:

FIG. 2 is a chart showing the relation between pressure in the tube and airplane speed for a ten-thousand pound bomb, with reference to the explosive type mechanism illustrated in FIG. 1;

FIG. 5 illustrates a modification of bomb launching mechanism involving an electrically-driven bomb-carrying cradle or carriage; and FIG. 6 illustrates diagrammatically one form of automatic control mechanism to regulate the muzzle velocity of the bomb to accord with the air speed of the airplane.

Figure 1:
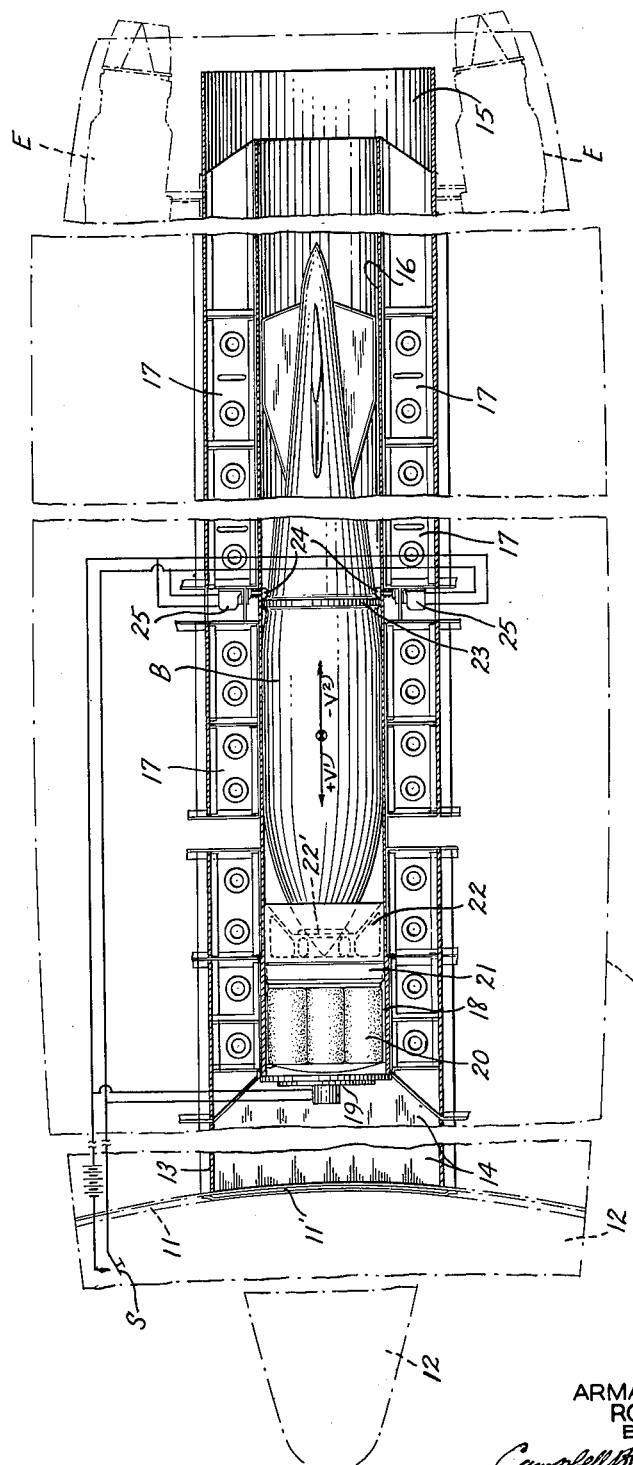
FIGURE 1 illustrates the outline of the fuselage of the high speed aircraft disclosed in said copending application, and in which the bomb tunnel is fitted with a torpedo tube through which the bomb is launched by an explosive type mechanism located in the forward end of the tube.

Referring to FIG. 1 of the drawings, numeral 10 designates the outline of the fuselage of the bombing airplane equipped with the bomb launching mechanism of this invention. The forward approximate one-third of the fuselage 10 is separated from the remainder by the bulkhead 11 and constitutes crew and equipment compartment 12. Disposed coaxially with the axis of the fuselage 10, and extending rearwardly from the bulkhead 11 is the tube 13 forming the tunnel 14 having its rear opening 15 adjacent to the rear end of the fuselage 10, as shown.

Mounted coaxially within the tunnel 14 by radial webs 17 is an elongated tube 16 having its forward end spaced from bulkhead 11 and its rear end terminating short of the rear end of tunnel 14. Securely mounted near the front end of the tube 16 is a breech 18 having the openable breech block 19 for access to the interior of the breech 18 for charging the same with powder bags 20 similar to the powder bags used in naval guns and rifles. The general construction of the breech 18 and breech block 19 is similar to the breech mechanism of a large naval rifle. Access to the breech block 19 for recharging and inspection may be had through bulkhead door 11' from the crew compartment 12.

Positioned immediately adjacent the discharge end of breech 18, but spaced therefrom by a gas expansion chamber 21, is the bomb nose cap 22 which is similar to a gun projectile in that it is driven rearwardly through the tube 16 similar to a projectile when the powder charge 20 is detonated by the usual electric spark type ignition operable by a contact switch S within the crew compartment 12.

The bomb nose cap 22 is provided with a socket 22' conforming generally to the shape of the nose of the bomb B and in which the nose of the bomb loosely rests. The bomb B fits relatively closely but slidably within the tube 16 and preferably has an ogive-shaped contour at the nose and a conventional finned tail. Approximately midway of the length of bomb B is a central bead 23 having a diameter slightly less than the inner diameter of the tube 16 and affording a guiding and centering function similar to the bourrelet of an artilerry projectile.

Projecting through the wall of the tube 16 at diametrically opposite sides of the projectile B are latches 24 which are urged inwardly behind bead 23 by springs for locking the bomb in place and which are retractable by solenoids 25 to release the bomb B for ejection from the tube 16. At the proper time, solenoids 25 are energized to retract latches 24 simultaneously with the detonation of the powder charge 20 when the switch S is closed for that purpose. The bomb cap 22, acting like a projectile, drives the bomb B rearwardly and then separates from the bomb so that it and the bomb fall independently.

Referring to FIG. 2, several curves for different effective lengths L of tube 16 are shown plotted on a chart whose ordinate is subdivided in miles per hour of bomb muzzle velocity, relative to the airplane air speed, which is considered to be the same as bomb muzzle velocity, and whose abscissa is subdivided into gas pressures in pounds per square inch within the tube 16 ahead of the nose cap 22. The curves are based on a bomb weight of 10,000 pounds and tube lengths L of 20, 25, 30 and 35 feet. Thus, for a twenty foot length tube, the powder charge 20 necessary to discharge the bomb at a predetermined muzzle velocity opposite but equal to aircraft air speed, say 400 miles per hour, must be chosen to provide a pressure of 2360 pounds per square inch within tube 16. The powder charge 20 necessary to obtain this tube pressure is determinable from known data. Similarly, for a thirty-five foot length tube and an air speed and muzzle velocity of 500 miles per hour, the powder charge 20 is selected to give a gas pressure within the tube 16 ahead of the bomb cap 22 of 2100 pounds per square inch. For bombs of different gross weight, the gas pressure within the tube 16 differs to attain the prescribed muzzle velocity and hence the curves of FIG. 2 would be different.

As stated and disclosed in greater detail in said copending application, the center of gravity C of the bomb B coincides with the center of gravity of the airplane so that as the bomb is ejected, the trim of the airplane is not materially changed regardless of the size and weight of the bomb, and as it is discharged rearwardly with a muzzle velocity equal to the air speed of the airplane, the bomb falls vertically to the target, i.e., $V^1 = V^2$ in FIG. 1 and as $V^1$ is positive and $V^2$ negative, $V^1 + V^2 = 0$, and the bomb B, in effect, stands still when it leaves the tube 16. It will be understood that the term "bomb" is used generically, and comprehends torpedoes and other projectiles within its scope.

Figure 3:
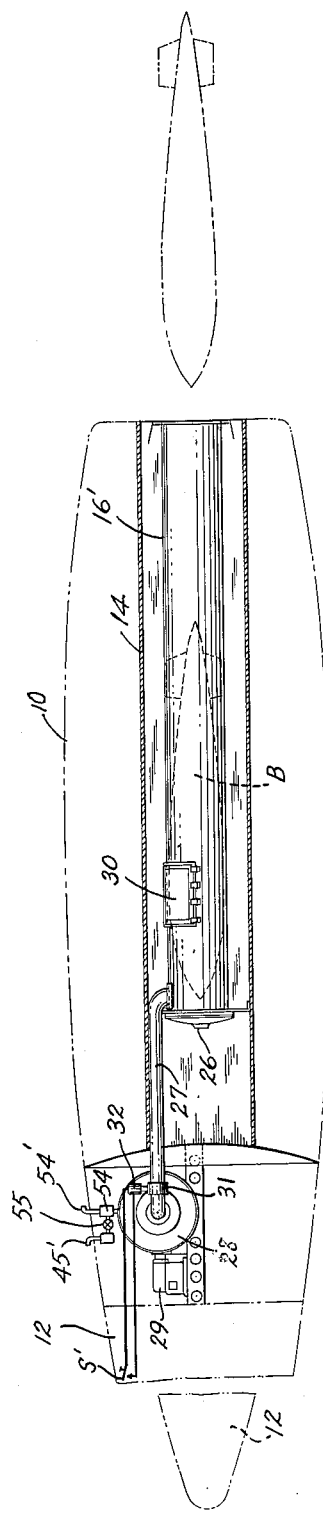
FIG. 3 illustrates another modified form of bomb launching mechanism in which a torpedo tube and compressed air are used.

Instead of ejecting the bomb B with an explosive charge as in the arrangement of FIG. 1, it may be pneumatically ejected from the torpedo tube 16' by mechanism similar to that used for launching submarine torpedoes as shown in FIG. 3. To that end, torpedo tube 16' is closed by the pressure head 26 at its forward end and is connected at that end by compressed air pipe 27 to compressed air tank 28 which is maintained at a predetermined air pressure by an air compressor driven by an auxiliary power plant 29 mounted within the crew compartment 12. Access to the bomb B may be had through a door 30 in the wall of the torpedo tube 16'.

A snap valve 31 operated by a solenoid 32 controlled from switch S' within the crew compartment 12 discharges air tank 28 through pipe 27 into the torpedo tube 16' ahead of the bomb B to eject the latter rearwardly to the dotted line position shown in FIG. 3. The air pressure within tank 28 is predetermined so as to eject bomb B rearwardly at a muzzle velocity equal to the aircraft spaced which has been predetermined as the speed at which the bomb will be dropped.

Figure 4:
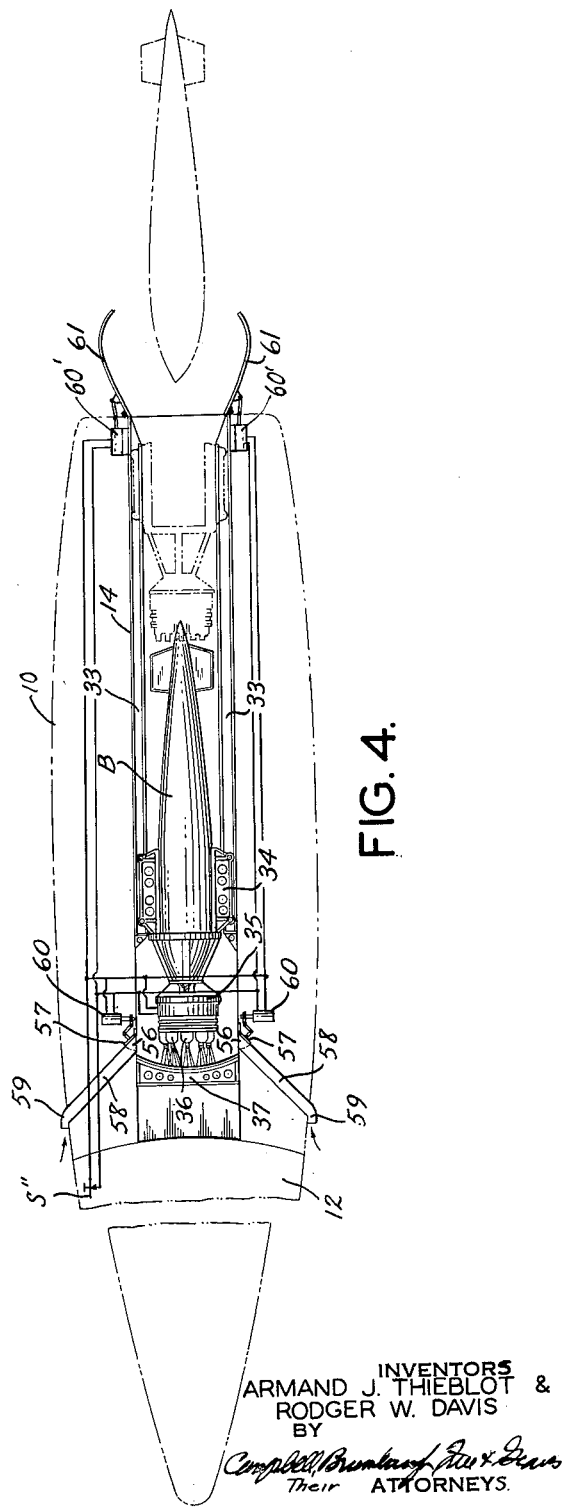
FIG. 4 illustrates still another modification in which the bomb-carrying carriage is equipped with a rocket reaction power mechanism.

Referring now to FIG. 4, the bomb tunnel 14 is equipped with rails 33 on which a jettison carriage 34 for the bomb B is adapted to roll aft so as to carry the bomb B coaxially out of the tunnel 14. Bomb B rests relatively loosely within carriage 34 so as to detach itself therefrom when ejected or discharged. In actual practice, the bomb B will become dislodged from the carriage 34 before the latter leaves the rails 33 at the end of the tunnel 14 as indicated in dotted lines in FIG. 4, and thus the bomb B and carriage 34 fall separately without interference.

As shown in FIG. 4, the front end of the carriage 34 is fitted with a head 35 provided with a group of forwardly directed rockets 36 preferably of the jet-accelerated take-off type. Immediately forward of the rockets 36 is a concave fire-proof bulkhead 37 closing the forward end of the tunnel 14 and constituting the target against which the rockets 36 react in driving the bomb carriage 34 rearwardly in the manner described. The ejection velocity of the bomb B is regulated by varying the rocket charge 36 so that the preferred muzzle velocity of the bomb B from the rear end of the tunnel 14 is predetermined and the air speed of the airplane controlled to equal that muzzle velocity at the moment that the bomb is discharged by ignition of the rockets 36 in the usual manner such as electrically by means of the switch S" in the crew compartment 12.

Referring now to the form of the invention illustrated in FIG. 5, the bomb B is suspended on a carriage or cradle 38 having rollers 39 riding on rails 40 secured to the inner surface of the bomb tunnel 14 as shown. As indicated in dotted lines, the rails 40 may be extended at 40' for loading the bomb B and cradle 38 more conveniently on the rails outside of the tunnel 14.

The carriage 38 is driven rearwardly by mechanical means such as an electric motor or a hydraulic piston and cylinder combination. For example, the lower edge of the rail 40 may be fitted with a rack 41 engaged by a pinion 42 driven by an electric motor 43 supplied with power by trolley wheels 44 or brushes engaging contact strips secured along the rails 40 in a conventional manner, but not shown.

By closing a switch S''' in the crew compartment 12, power is applied to the contact strips to energize the motor 43 which accordingly drives the carriage 38 rearwardly, carrying the bomb B with it along the axis of the tunnel 14. Upon reaching the end of the rails 40, the carriage is jettisoned with the bomb which is disconnected therefrom in the manner previously described in connection with FIG. 4.

Preferably, the speed of discharge of the bomb B is automatically regulated to accord with the instantaneous air speed of the aircraft at the time of discharge of the bomb B. To this end, motor 43 driving carriage or cradle 38 is controlled through a suitable mechanism such as is schematically illustrated in FIG. 6 wherein a Pitot tube 45 extending into the slip stream controls the compression of the bellows 46 sealed within the housing 47 with which the Pitot tube 45 connects, this bellows 46 containing a suitable motion transmission fluid such as oil. As the air pressure within housing 47 compresses bellows 46 against spring 48, the fluid within bellows 46 is driven through pipe 49 to a motor bellows 50 connected by linkage 51 to the brush 52 of a rheostat 53 in the circuit of motor 43 whereby the speed of motor 43 is regulated in accordance with the air speed of the airplane to drive the carriage 38 at a rate such as to discharge the bomb B at the same instantaneous air speed as that at which the airplane is then travelling.

Similar arrangements may be effected for automatically regulating the discharge of the bomb in respect to other forms of the invention. For example, referring to FIG. 3, the Pitot tube 45' and the motion transmission system of FIG. 6 controls a blow-off valve 54 in a discharge pipe 54' leading from compressed air tank 28 to atmosphere. The compressor 29 maintains a predetermined total air pressure within compressed air tank 28 which equals at least that necessary to discharge the bomb B at the highest air speed predetermined for that mission. At lower air speeds, valve 54 is automatically opened to reduce the air pressure within compressed air tank 28 to accommodate the air speed at the time that the bomb is to be discharged. In order to maintain maximum air pressure within tank 28, the Pitot tube 45' and the control of valve 54 are disabled by suitable valve means 55 until the airplane reaches the predetermined speed so that the valve 54 is only adjusted as the airplane approaches the target.

In cases where the discharge of the projectile is effected by the pressure of combustion gases as in the case of the explosive arrangement of FIG. 1 and the "jato" arrangement of FIG. 4, it is desirable to purge the bomb tunnel 14 of FIG. 4 and the torpedo tube 16 of FIG. 1 of the combustion gases. As shown in FIG. 4, they may be purged by introducing the boundary air under pressure through openings 56 in the side wall of tunnel 14 which are normally closed by valves 57 and which communicate by passages 58 with air scoops 59 projecting slightly into the boundary air layer for collecting a portion of the latter and introducing the same into the tunnel 14 when valves 57 are opened by solenoids 60 energized simultaneously with the ignition of the rockets 36 when the switch S" is closed in the manner previously described.

Instead of keeping the rear end of the bomb tunnel normally open, it may be normally closed by a suitable door, such as the "orange peel" door 61 indicated in FIG.

4, which is opened by solenoid 60' when the switch S" is closed to permit air to flow through tunnel 14 to aid combustion when valves 57 are open, flush out spent combustion gases, and also to aid ejection of the bomb by the ram effect of the pressure air entering passages 58 and tunnel 14 ahead of the bomb B. Further details of door 61 may be had upon reference to said copending application. It will be understood that door 61 or its equivalent may be used in the other forms of the invention.

Operation of the projectile launching mechanism of this invention has been described in connection with various figures of the drawings, and it will be understood that in accordance with the invention, the bomb, torpedo or other projectile is discharged, ejected or fired, as the case may be, rearwardly at a velocity equal to the air speed of the airplane so that when the bomb clears the airplane, it is in effect, stationary and hence, turns downwardly by gravity for a trajector-less vertical flight to the target. The muzzle velocity of the projectile is either predetermined and the air plane speed adjusted thereto over the target, or the muzzle velocity of the projectile may be automatically adjusted to the air speed of the airplane in the manner described.

By discharging the projectile along the axis of the fuselage and with a streamlined fuselage of symmetrical shape about its longitudinal axis, any air turbulence which might be occasioned by the boundary layer moving over the fuselage is nullified on the rearward projection of the longitudinal axis of the fuselage, which is the same axis along which the projectile is discharged. Hence, the projectile is substantially undisturbed by the air stream since it is moving in the opposite direction and at the same rate until it turns downwardly and then it falls freely by gravity.

Also, there is no aerodynamic disturbance of the air stream to disturb the bomb flight by reason of tilt of the airplane itself as the result of discharge of the heavy bomb or other projectile, since the center of gravity of the bomb is coincident with the center of gravity of the airplane and hence the discharge of the bomb B from the static balance position shown does not materially affect the trim of the airplane, as is described in greater detail in said copending application.

In some cases, especially where marine or aerial type of torpedoes are employed for low level attack against boats, the torpedo might be launched at a speed lower than the speed of the airplane in order to impart a certain predetermined forward speed to the torpedo. The form shown in FIG. 5 is particularly adapted to such tactic, because of the ready low speed control of the torpedo launching by manually regulating the speed of the motor 43 with a rheostat like 52, 53, in FIG. 6, which may be done in flight from the crew compartment 12.

Although certain preferred embodiments of the invention have been illustrated and described herein, it is to be understood that the invention is not limited thereto, but is susceptible to changes in form and detail within the scope of the appended claim.

We claim:

In a bombing airplane having a propulsion power plant, a susbtantially cylindrical fuselage, supporting and orienting surfaces, and a rear-opening tunnel arranged within said fuselage, the combination of a support for a projectile within said tunnel, electric power means for driving said support rearwardly toward the open end of said tunnel, a source of power for said power means, electrical control means interposed between said power source and said power means for regulating the velocity at which the power means drives said projectile support, air speed responsive means on said airplane, and operative connections between said responsive means and said regulating means for adjusting the speed at which said power means discharges said projectile from said tunnel.

References Cited in the file of this patent

UNITED STATES PATENTS

| | | |
|---|---|---|
| 1,621,654 | Boos | Mar. 27, 1927 |
| 2,342,022 | Trimbach | Feb. 15, 1944 |
| 2,356,674 | Himmel | Aug. 22, 1944 |
| 2,381,332 | Boldt | Aug 7, 1945 |
| 2,433,284 | Luck | Dec. 23, 1947 |
| 2,470,120 | Walker | May 17, 1949 |

FOREIGN PATENTS

| | | |
|---|---|---|
| 238,222 | Germany | Sept. 21, 1911 |
| 328,847 | Italy | Aug. 22, 1935 |
| 863,601 | France | Jan. 6, 1941 |